(12) United States Patent
Beall

(10) Patent No.: US 11,305,238 B2
(45) Date of Patent: Apr. 19, 2022

(54) METHODS AND APPARATUS FOR PREVENTING DAMAGE BY A REVERSE OSMOSIS FILTRATION SYSTEM HAVING A LEAK

(71) Applicant: Topper Manufacturing Corporation, Torrance, CA (US)

(72) Inventor: Timothy Allen Beall, Redondo Beach, CA (US)

(73) Assignee: Topper Manufacturing Corporation, Torrance, CA (US)

( * ) Notice: Subject to any disclaimer, the term of this patent is extended or adjusted under 35 U.S.C. 154(b) by 0 days.

(21) Appl. No.: 15/874,765

(22) Filed: Jan. 18, 2018

(65) Prior Publication Data

US 2018/0345225 A1    Dec. 6, 2018

Related U.S. Application Data

(60) Provisional application No. 62/514,561, filed on Jun. 2, 2017.

(51) Int. Cl.
*B01D 65/10* (2006.01)
*B01D 61/08* (2006.01)
(Continued)

(52) U.S. Cl.
CPC .......... *B01D 65/102* (2013.01); *B01D 61/08* (2013.01); *B01D 65/104* (2013.01);
(Continued)

(58) Field of Classification Search
None
See application file for complete search history.

(56) References Cited

U.S. PATENT DOCUMENTS 4,083,781 A * 4/1978 Conger ................ B01D 61/022
                                                                      210/651
4,801,375 A * 1/1989 Padilla .................. B01D 61/08
                                                                      210/100

(Continued)

FOREIGN PATENT DOCUMENTS

WO    WO-2009/097369    8/2009

OTHER PUBLICATIONS

Ningbo Homaster Electrical, Applicances Co., Ltd., "Leak Shut Off Valve (HDJM-J01) Product Information", downloaded from https://water-dispensers.en.made-in-china.com/print/qXMJmERBvaYb/China-Leak-Shut-off-Valve-HDJM-J01.html, undated, 2 pp. total.

*Primary Examiner* — Richard C Gurtowski
(74) *Attorney, Agent, or Firm* — Womble Bond Dickinson (US) LLP

(57) ABSTRACT

Reverse osmosis filter apparatus having a reverse osmosis filter system, a pan connected to the reverse osmosis filter system and located at the bottom thereof to collect water that leaks from the reverse osmosis filter system and a water sensing shut-off valve connected to the pan, the water sensing shut-off valve being coupled between a raw water input and the reverse osmosis filter system, the water sensing shut-off valve being connected to the pan at a location to sense the presence of water collecting in the pan and to disconnect the reverse osmosis filter system from the raw water input when the presence of water is sensed. Various features and embodiments are disclosed.

8 Claims, 7 Drawing Sheets

(51) Int. Cl.
    *B01D 61/12* (2006.01)
    *B01D 61/02* (2006.01)
    *B01D 61/10* (2006.01)

(52) U.S. Cl.
    CPC ............ *B01D 61/025* (2013.01); *B01D 61/10* (2013.01); *B01D 61/12* (2013.01); *B01D 2311/14* (2013.01); *B01D 2313/18* (2013.01)

(56) References Cited

U.S. PATENT DOCUMENTS

| | | | |
|---|---|---|---|
| 6,093,312 | A | 7/2000 | Boulter |
| 6,110,360 | A | 8/2000 | Hart, Jr. |
| 7,601,256 | B2 | 10/2009 | Beall |
| 7,726,511 | B2 | 6/2010 | Beall |
| 7,763,171 | B2 | 7/2010 | Beall |
| 9,731,984 | B2 | 8/2017 | Beall |
| 2006/0138031 | A1 | 6/2006 | Kloos et al. |
| 2007/0045165 | A1 | 3/2007 | Beall |
| 2007/0045327 | A1 | 3/2007 | Beall |
| 2007/0289904 | A1 | 12/2007 | Oklejas |
| 2008/0203026 | A1 | 8/2008 | Beall |
| 2009/0173676 | A1* | 7/2009 | Wolbers ................ B01D 61/06 210/130 |
| 2015/0336814 | A1 | 11/2015 | Beall |
| 2017/0297927 | A1 | 10/2017 | Beall |

* cited by examiner

METHODS AND APPARATUS FOR PREVENTING DAMAGE BY A REVERSE OSMOSIS FILTRATION SYSTEM HAVING A LEAK

CROSS-REFERENCE TO RELATED APPLICATIONS

This application claims the benefit of U.S. Provisional Patent Application No. 62/514,561 filed Jun. 2, 2017.

BACKGROUND OF THE INVENTION

1. Field of the Invention

The present invention relates to the field of reverse osmosis filter systems, and more particularly to leak detection and control in such systems.

2. Prior Art

Prior art reverse osmosis filter systems were generally not mass produced systems delivered to an installation site ready for water connection, but rather were one of a kind or few of a particular design that were primarily assembled on site with exposed connections and in a physical arrangement to accommodate the space available. It is unknown whether any such systems included any leak detection of any kind, and if so, such leak detection and water shutoff, if used would have required separate installation, and normally would have required an electrical connection for sensing the water, and particularly for operation of a solenoid operated shut-off valve upon sensing of the water.

DETAILED DESCRIPTION OF THE PREFERRED EMBODIMENTS

Figure 1:
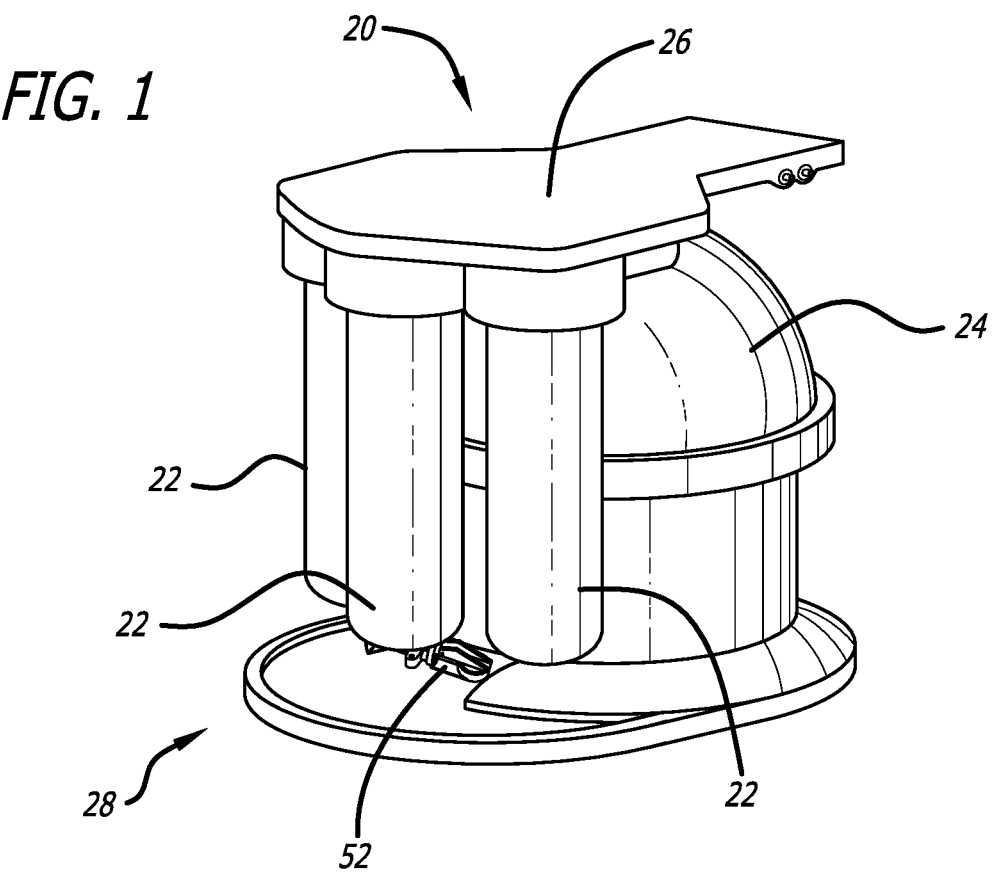
FIG. 1 is a view of a reverse osmosis water filter system with the cover removed and incorporating the present invention.

First referring to FIG. 1, a reverse osmosis filtration system incorporating the present invention may be seen. The reverse osmosis filtration system shown is in accordance with U.S. Pat. Nos. 7,601,256 and 9,731,984, the disclosures of which are incorporated herein in their entirety by reference. Also incorporated herein by reference are U.S. patent application Ser. No. 15/647,670, U.S. Pat. Nos. 7,726,511 and 7,763,171, and U.S. Provisional Patent Application No. 62/460,638. Parts of the reverse osmosis filtration system 20 particularly visible in this Fig. include filter cartridges 22, the center of the three cartridges having the reverse osmosis filter membrane therein, and the product water storage tank 24, which components are coupled to a manifold assembly 26, which components are generally in accordance with the foregoing patent and published application. Also visible in FIG. 1 is a base or pan 28, better illustrated in subsequent Figs.

Figure 2:
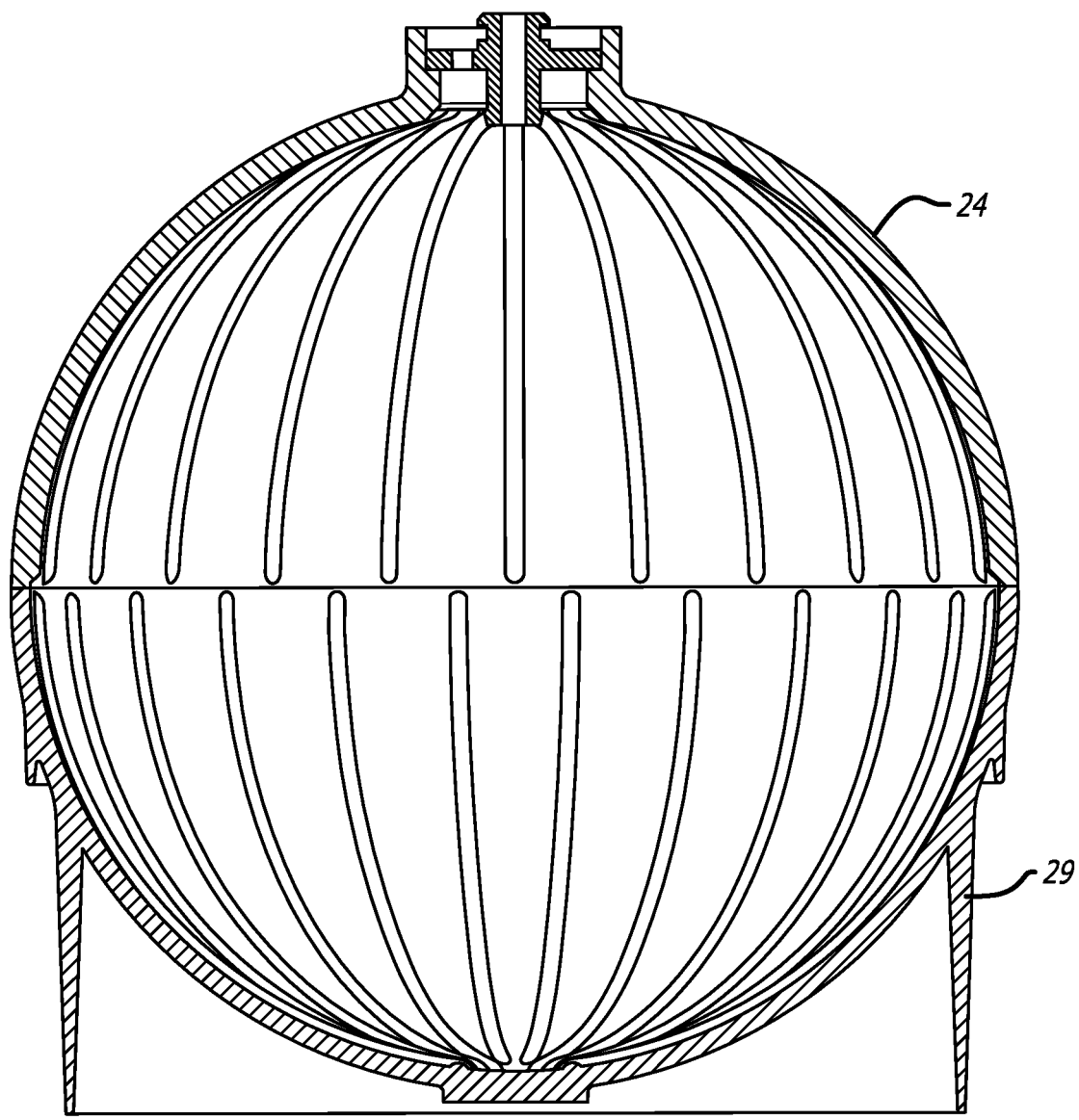
FIG. 2 is a cross sectional view of the product water storage tank 24 of FIG. 1.
Figure 3:
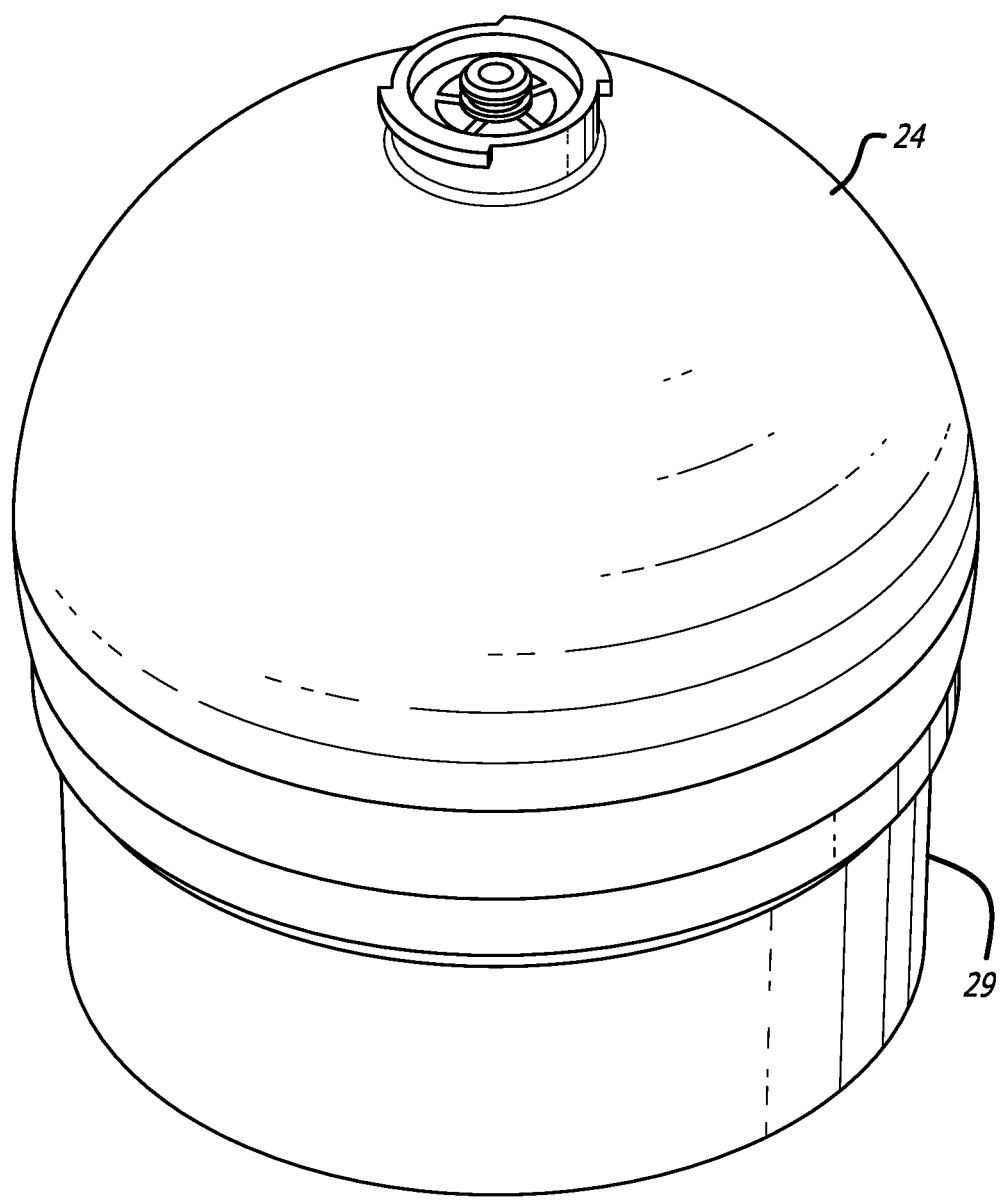
FIG. 3 is a view of the product water storage tank 24 of FIG. 1.

Now referring to FIGS. 2 and 3, illustrations of the construction of the product water storage tank 24 shown in FIG. 1 may be seen. FIG. 2 as well as FIG. 3 are taken from U.S. Pat. Nos. 7,726,511 and 7,763,171 (wherein they had different identification numbers). Of particular importance to the specific embodiment being described in this disclosure is the fact that the product water storage tank 24, while being basically spherical on the inside, also includes an integral molded skirt 29 (also shown in FIG. 2) which provides a ring-like base for supporting the reverse osmosis filtration system.

Figure 4:
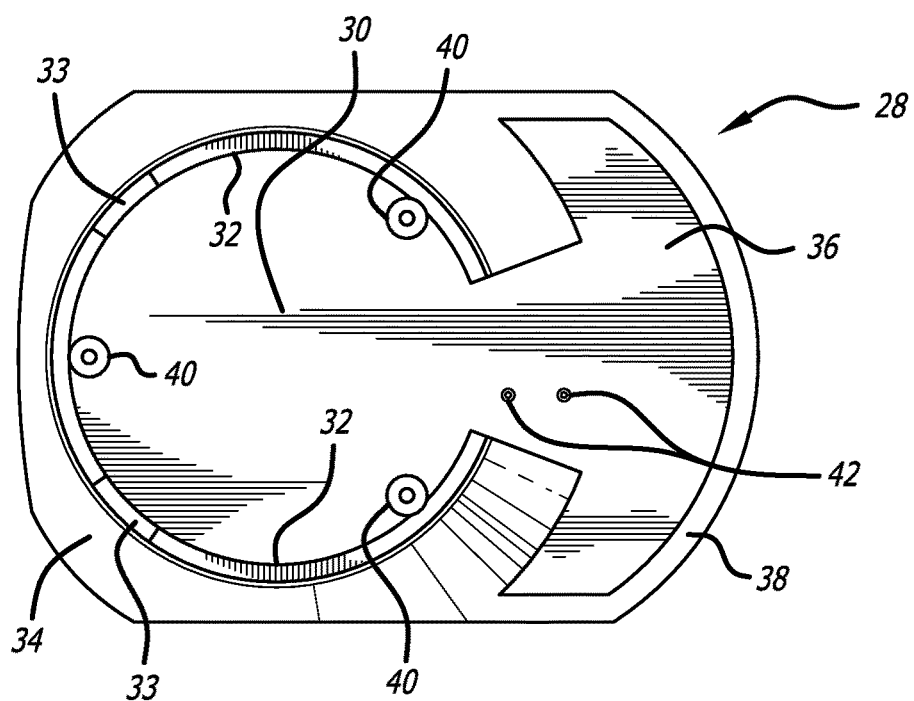
FIG. 4 is a top view of the base or pan 28 of FIG. 1.

A top view of the pan 28 with the reverse osmosis filtration system 20 removed therefrom can be seen in FIG. 4. The pan 28 may be characterized as defining a substantially planar lowest top surface area 30, part of which has further raised areas 32 for receiving the lower edge of the skirt 29 on the product water storage tank 24 (FIGS. 2 and 3), with a still higher elevated region 34 surrounding regions 32 to confine the skirt 29 to a generally concentric orientation with respect to the structure of the pan 28 just described. Raised areas 32 are also interrupted by depressions 33 relative to the raised areas, which depressions will better facilitate the flow of leakage water, if any, under the skirt 29 to the generally planar surface 30. The generally planar surface 30 also extends outward to regions 36, wherein its periphery is surrounded by a lip region 38. Also visible in FIG. 4 are three raised regions 40, each having a central hole therein. Finally, two much smaller and shorter raised regions 42 are also visible in the Fig.

Figure 11:
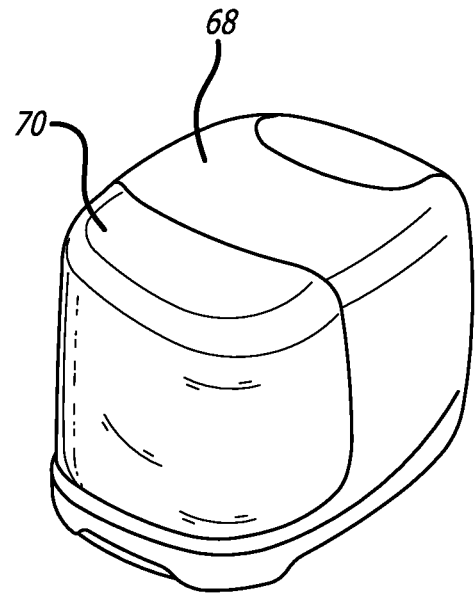
FIG. 11 illustrates the reverse osmosis system of FIG. 1 with a removable decorative cover with a snap off front for access to the cartridges therein.

The size of the pan 28 is somewhat a matter of choice. As a minimum, it should be of a size and design to capture and accumulate water that runs down any component of the reverse osmosis filter system as a result of a leak so that any meaningful accumulation of such water will cause actuation of the water sensing shut-off valve to shut off the water supply to the system. Such a pan 28 may not necessarily extend under some overhanging regions of the reverse osmosis filter system, yet function well if any possible leak in that area will run down the surface of the reverse osmosis filter system and be captured by the pan as opposed to dripping outside the footprint of the pan 28. Alternatively, the pan 28 may have a footprint large enough to capture water dripping from some overhanging structure of the reverse osmosis filter system if that is a real concern to the designer. Note that while one can envision a squirting type leak suddenly occurring that would squirt water outside the footprint of the reverse osmosis filter system, the reverse osmosis system is normally provided with a removable decorative cover 68 (FIG. 11) with a snap off front 70 to provide easy access to the cartridges 22, which cover 68 and snap odd front 70 confines any such leak to assure that an adequate amount of the leaking water is accumulated in the pan 28 to trigger the water sensing shut-off valve 52. In that regard the amount of water needed to trigger the water sensing shut-off valve 52 is not substantial, though one cannot be assured that each installation will be perfectly level, and in some installations, some accumulation may be needed under the product water storage tank 24 before that accumulation reaches the water sensing shut-off valve 52. Actually that is one reason that areas 40 (FIG. 4) are higher above regions 36 than raised regions 42 that actually locate and hold the water sensing shut-off valve 52.

Figure 5:
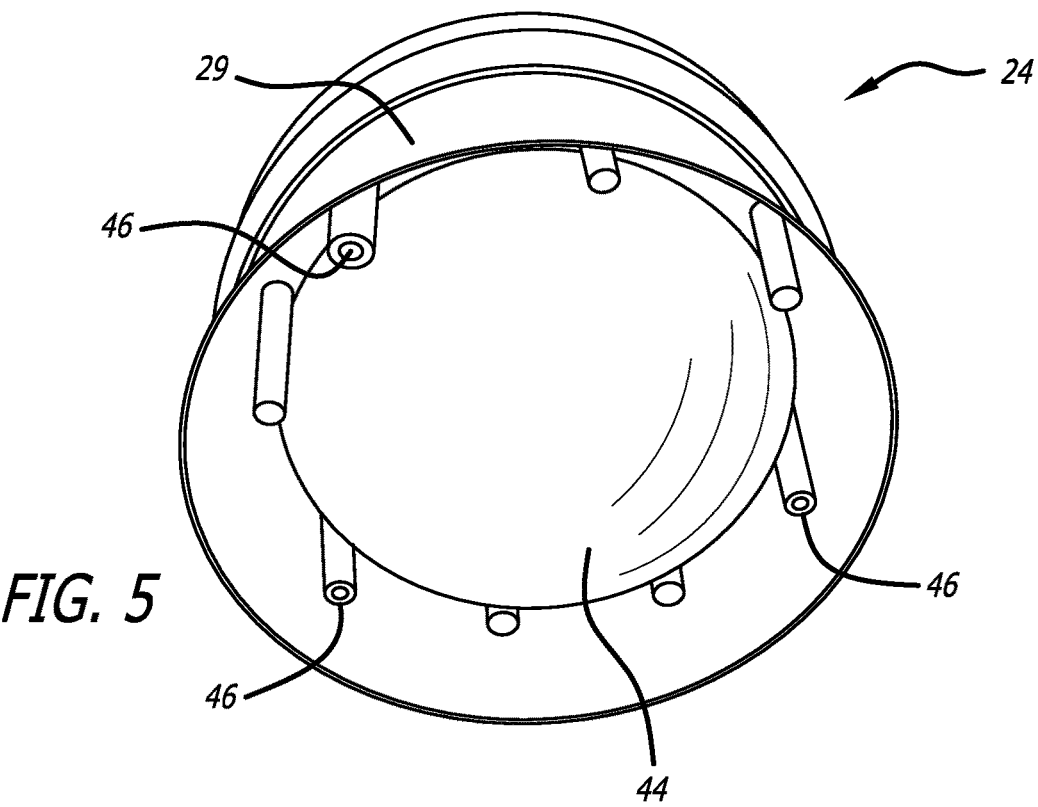
FIG. 5 is a bottom view of the product water storage tank 24 of FIG. 1.

Now referring to FIG. 5, a picture of the base of the product water storage tank 24 may be seen. Visible in this Fig. is the bottom 44 of the product water storage tank 24, as well as the base or skirt 29 thereof. Also visible in this Fig. are three screw receptacles 46 which, when the product water storage tank 24 is properly positioned within the base or pan 28, rests on raised areas 40 (FIG. 4), with the outer edge of the skirt 29 also resting on regions 32 in the pan. Thus screws may be used to connect the pan 28 and the product water storage tank 24 so that the pan provides increased stability for the reverse osmosis filtration system. In that regard, note that regions 40 and 46 are in unsymmetrical matching patterns so that the pan 28 and the product water storage tank 24 must be properly aligned before all three screws may be placed in position and tightened. Once the screws are put in place and tightened, the pan becomes a part of the reverse osmosis filter system so that an installer cannot forget to use the pan. Further once the pan is fastened to the product water storage tank 24, it need not be later removed for any reason, as the cartridges 22 (FIG. 1), can be released from the manifold assembly 26 and replaced as necessary without disturbing the pan.

Figure 6:
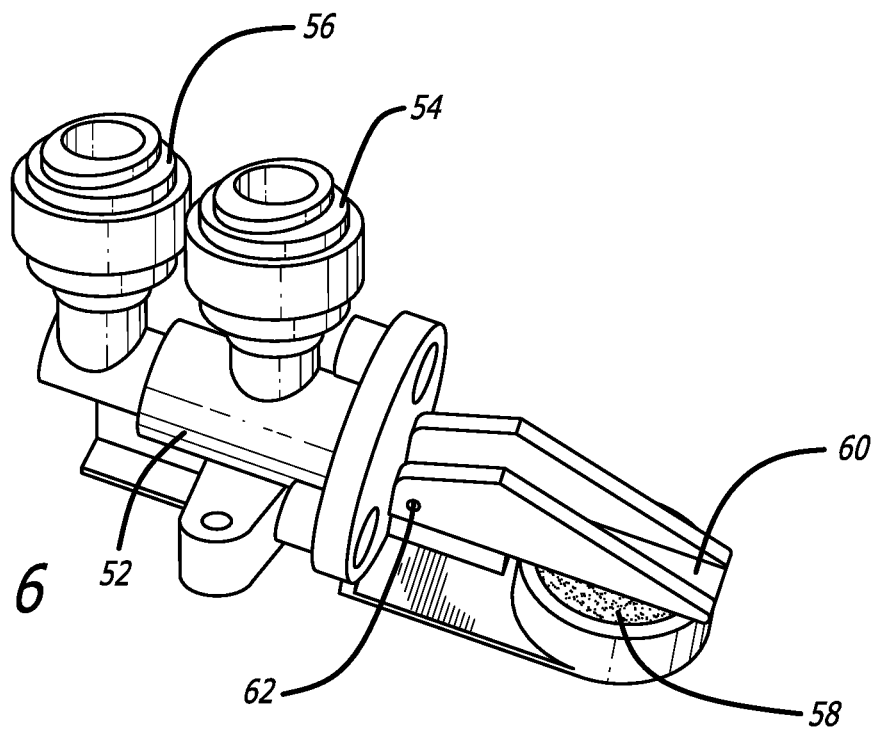
FIG. 6 is view of the water sensing valve 52 of FIG. 1 illustrated on the valve open condition ready for water sensing.

Now referring to FIG. 6, a water sensing valve 52 may be seen. The water sensing valve 52 has an inlet connection 54 and an outlet connection 56, as well as an extension away from the inlet and outlet connection region to confine a water sensing pellet 58 under arm 60 shown in their first stable position, a valve open condition, which arm is rotatable around the axis of pin 62. If pellet 58 is subjected to any quantity of water, its outer covering will dissolve and the center thereof will swell to force arm 60 upward, at first pulling the water sensing valve 52 further toward the open condition against a spring therein urging the water sensing valve 52 toward a closed position, after which an over center action resulting from the shape of arm 60 against the body of the water sensing valve 52 causes the water sensing valve 52 to snap to its second stable position shown in FIG. 7 to close the water sensing valve 52. Thereafter, water pressure on the inlet connection 54 only increases the force on the valve moving member toward to the closed position.

Figure 7:
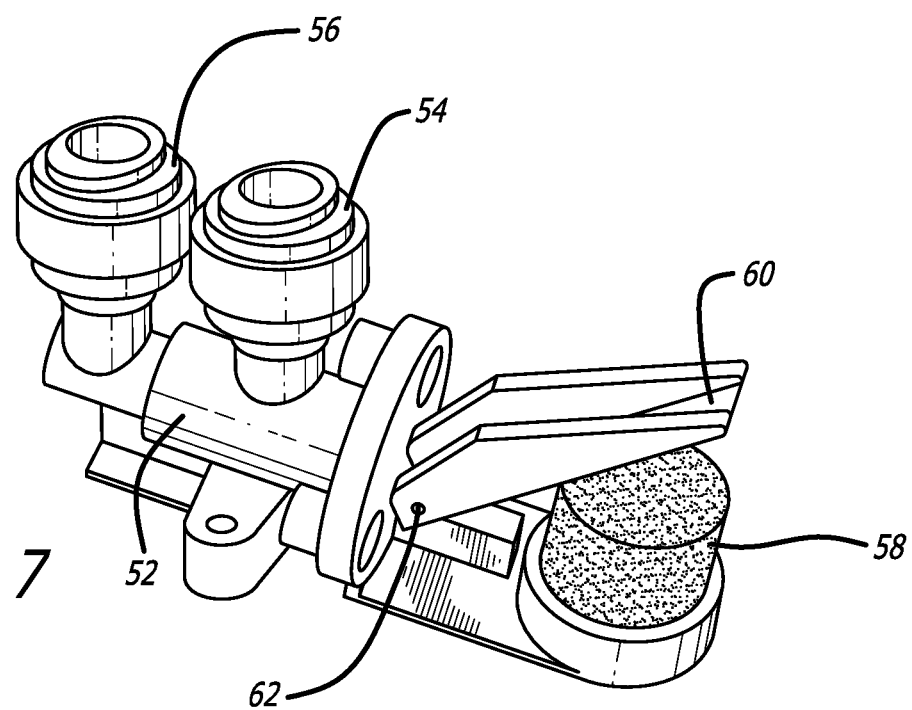
FIG. 7 is view of the water sensing valve 52 of FIG. 1 illustrated on the valve closed condition after having sensed the presence of water.
Figure 8:
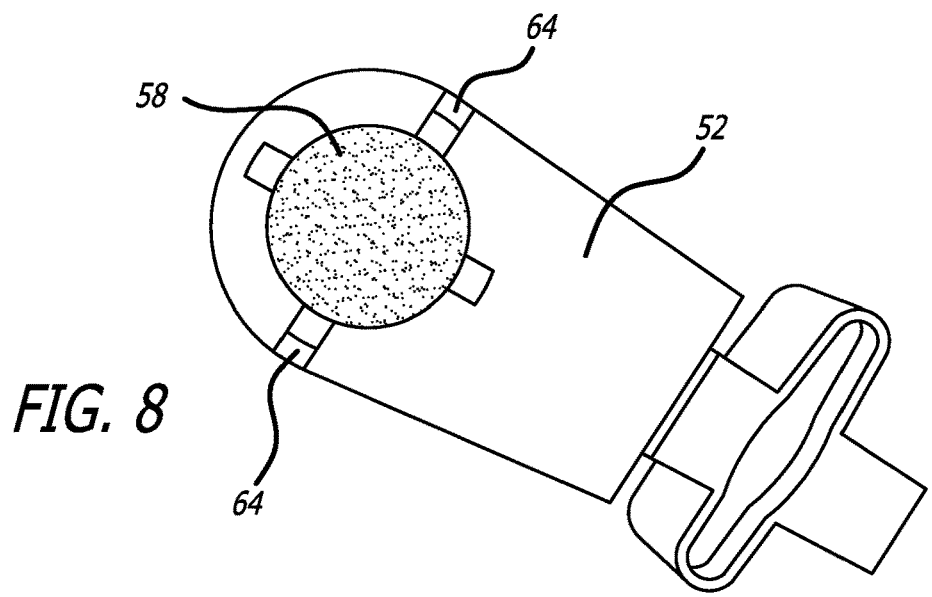
FIG. 8 is a bottom view of the water sensing valve 52.

FIG. 8 shows a bottom view of the water sensing valve 52 of FIGS. 6 and 7, which shows the bottom of pellet 58 extending through an opening in the bottom of the water sensing valve, with slots 64 assuring that when the water sensing valve 52 is placed on a relatively flat surface, water collecting thereon will reach the pellet 58 through slots 64 to assure that the water sensing valve operates as described. Valves of this general type are available commercially from a number of venders, and in fact, the water sensing valve pictured herein is a commercially available valve. The particular water sensing shut-off valve used in this exemplary embodiment is mechanical water sensing shut-off valve, specifically a HDJM-J01-Leak Shut-off valve manufactured by Ningbo Homaster Electrical Appliances Co., Ltd-China, though other water sensing shut-off valves may be used if desired. In the regard, numerous electrically operated water sensing shut-off valves are also commercially available that could be used, though most are substantially larger than needed and may be out of proportion for a satisfactory implementation with a preferred embodiment of the present invention. Also the reverse osmosis filter system used with the exemplary embodiment is self-contained and fully automatic without the use of electricity (it is a hydraulically operated system), and the need to provide and cost to provide an electrical connection simply for the water sensing shut-off valve would be a strong deterrent to its use.

Figure 9:
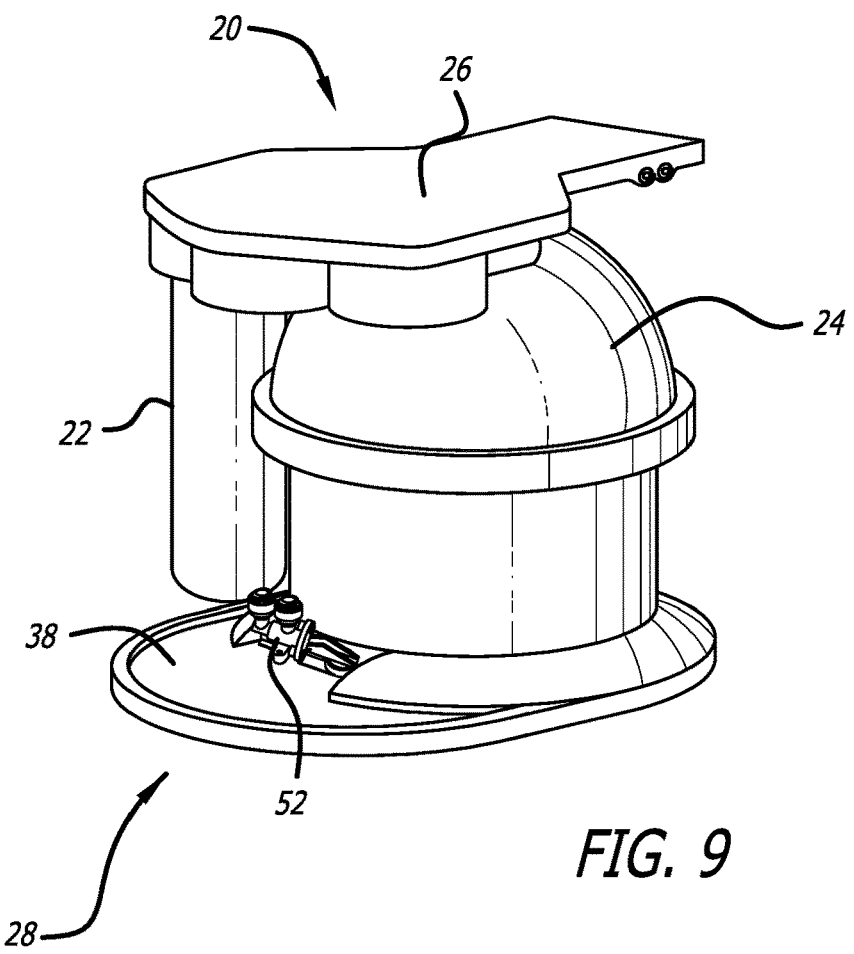
FIG. 9 is a front view of the reverse osmosis filter system with only one filter cartridge 22 mounted thereon and illustrating the water sensing valve 52 as mounted to the base or pan 28.

Now referring to FIG. 9, the water sensing valve 52 may be seen with its mounting screw holes placed over raised regions 42 (FIG. 4), which positively locates the water sensing valve 52 with respect to the pan 28, with FIG. 1 showing the water sensing valve 52 positioned behind filter cartridges 22 so as to not interfere with the removal and replacement of the filters. When so positioned, screws are then used to fasten the water sensing valve 52 to the pan 28. Note that like the pan 28 itself, once connected to the pan 28 as described and connected into the water line, the water sensing valve 52 like the pan 28, can become an integral part of the self-contained reverse osmosis filter system at the time of manufacture, so as to not require the intention of the installer at the time of installation. Also note that the raised regions 42, like the raised areas 40 elevate the holes therein for the screws to a level above any standing water leakage that will cause the operation of the water sensing shut-off valve so that sealing around the screw heads is not required.

In normal operation, the water sensing valve 52 is coupled in series with the line supplying water to the reverse osmosis filtration system so that if a leak should ever occur in that system, water will accumulate in the substantially planar lowermost surface of the pan 28 (FIG. 4), triggering the pellet 58 which on swelling will trigger the over center action of the water sensing valve 52 from its open position, shown in FIG. 6, to its closed position shown in FIG. 7, shutting off all water to the reverse osmosis filtration system until the leak is fixed, any accumulated water is cleaned up, the pellet in the water sensing valve 52 is replaced and the water sensing valve is reset to the valve open condition.

Figure 10:
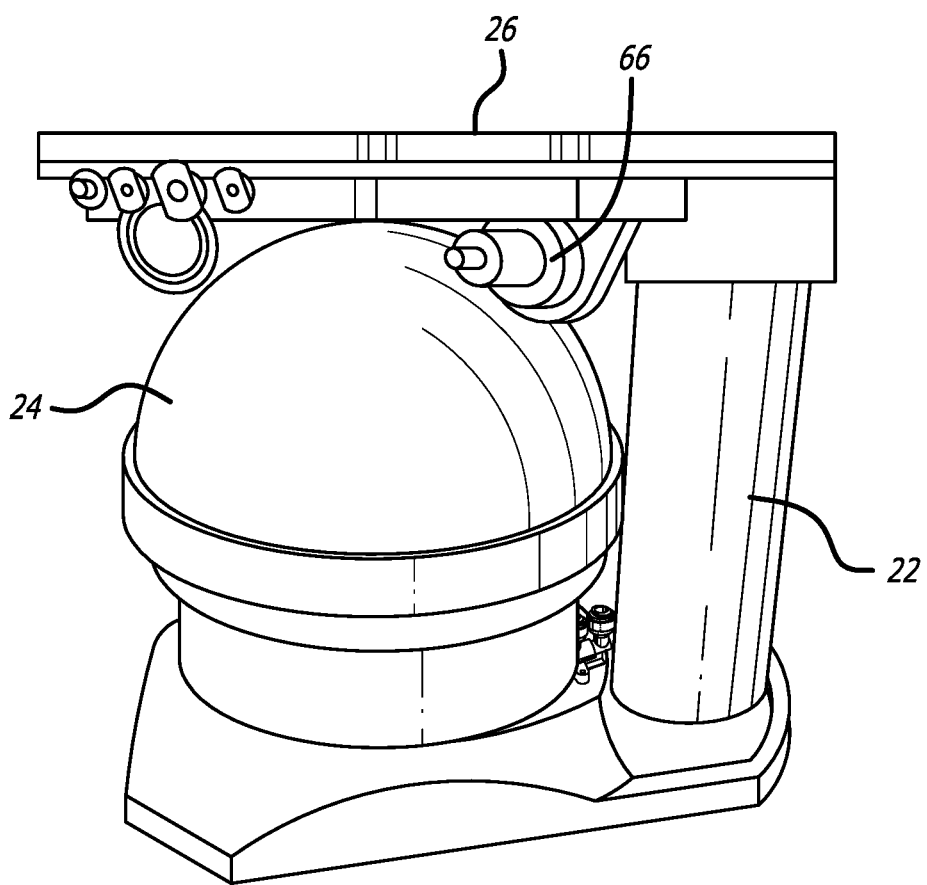
FIG. 10 is side view of the reverse osmosis filter system with only one filter cartridge 22 mounted thereon and illustrating the water sensing valve 52 as mounted to the base or pan 28.

The specific reverse osmosis filtration system for which the present invention is used may include a pressure regulator 66 (U.S. Pat. No. 9,731,984), visible in FIG. 10, to which the source of raw water is connected so that the pressure regulated output of the pressure regulator 66 will limit the maximum pressure that the rest of the reverse osmosis filtration system will be exposed to. Accordingly, the present invention could be connected so that the source of raw water is connected to the inlet connection 54 of the water sensing valve 52 and the outlet connection 56 thereof is connected to the inlet to the pressure regulator 66. Such a connection would mean that the water sensing valve 52, as well as the pressure regulator 66, would both have to tolerate the higher pressures of the raw water supply, whatever that might be. Alternatively, and as in a preferred embodiment, the raw water connection is to the input to the pressure regulator 66, with the pressure regulated output thereof then going to the input of the water sensing valve 52, with the output of the water sensing valve then proceeding to the input to the rest of the reverse osmosis filtration system. This results in the water sensing valve never being subjected to the highest pressures of the raw water supply.

If a leak occurs in the reverse osmosis filtration system, the water will accumulate in the pan 28 to trigger the over center mechanism of the water sensing shut-off valve 52 to shut off the water sensing valve shut-off valve, thereby limiting further leakage. Water sensing valves of the foregoing type are well known for general use. However, in many cases, if used at all, they are placed on the floor under or next to an appliance. The production of what amounts to a complete reverse osmosis filtration system having a water collection pan at the bottom thereof, together with a leakage water sensing shut-off valve as an integral part of the reverse osmosis filtration system assembly, is clearly new and answers a long-felt need, as it provides a clear protection to all users of the reverse osmosis system right out of the box, so to speak. Also, while the present invention has been disclosed with respect to limited specific embodiments, obviously the invention is applicable to reverse osmosis systems of other designs and operating characteristics, whether air captive or squeeze water based product water storage and dispensing.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. Reverse osmosis filter apparatus comprising:
    a reverse osmosis filter system;
    a pan connected to the reverse osmosis filter system and located at the bottom of the reverse osmosis filter system to collect water that leaks from the reverse osmosis filter system;
    a non-electrical, water sensing shut-off valve connected to the pan and having a water sensing pellet, the water sensing shut-off valve being coupled between a raw water input and the reverse osmosis filter system, to sense presence of water collecting in the pan;
    wherein when the presence of water collected in the pan is sensed, the water sensing pellet swells to urge the non-electrical, water sensing shut-off valve toward a closed position that closes the non-electrical, water sensing shut-off valve to disconnect the reverse osmosis filter system from the raw water input.

2. The apparatus of claim 1 wherein the reverse osmosis filter system includes a pressure regulator to regulate the pressure of the raw water input to the reverse osmosis system.

3. The apparatus of claim 2 wherein the raw water input is coupled to the pressure regulator and the pressure regulator is coupled to the water sensing shut-off valve.

4. The apparatus of claim 2 wherein the raw water input is coupled to the water sensing shut-off valve and the water sensing shut-off valve is coupled to the pressure regulator.

5. The apparatus of claim 1 wherein the pan is sized to at least collect water that leaks from the reverse osmosis filter system and runs down the reverse osmosis filter system to the pan.

6. The apparatus of claim 1 wherein the pan is sized to collect water that drips from the reverse osmosis filter system.

7. The apparatus of claim 1 wherein the reverse osmosis system is a hydraulically operated system, thereby not having and not requiring a connection to an electrical power supply.

8. The apparatus of claim 7 wherein the water sensing shut-off valve is a mechanical water sensing shut-off valve, also thereby not having and not requiring a connection to an electrical power supply.

\* \* \* \* \*